United States Patent
Kim

(10) Patent No.: US 10,392,509 B2
(45) Date of Patent: Aug. 27, 2019

(54) HIGH-GRADE ASPHALT COMPOSITION HAVING WATERPROOF FUNCTION AND CONSTRUCTION METHOD USING THE SAME

(71) Applicant: KOREA ROAD TECHNOLOGY CO., LTD, Namyangju (KR)

(72) Inventor: In Joong Kim, Namyangju (KR)

(73) Assignee: KOREA ROAD TECHNOLOGY CO., LTD., Namyangju (KR)

(*) Notice: Subject to any disclaimer, the term of this patent is extended or adjusted under 35 U.S.C. 154(b) by 0 days.

(21) Appl. No.: 15/416,018

(22) Filed: Jan. 26, 2017

(65) Prior Publication Data

US 2017/0226343 A1    Aug. 10, 2017

(30) Foreign Application Priority Data

Feb. 4, 2016   (KR) .................. 10-2016-0014074

(51) Int. Cl.
| | | |
|---|---|---|
| C08L 95/00 | (2006.01) | |
| E01C 7/26 | (2006.01) | |
| E01C 19/18 | (2006.01) | |
| E01C 7/18 | (2006.01) | |
| E01C 7/30 | (2006.01) | |

(52) U.S. Cl.
CPC .............. *C08L 95/00* (2013.01); *E01C 7/182* (2013.01); *E01C 7/185* (2013.01); *E01C 7/187* (2013.01); *E01C 7/262* (2013.01); *E01C 7/265* (2013.01); *E01C 7/267* (2013.01); *E01C 7/30* (2013.01); *E01C 19/18* (2013.01); *C08L 2205/035* (2013.01); *C08L 2205/16* (2013.01); *C08L 2555/50* (2013.01); *C08L 2555/60* (2013.01); *C08L 2555/82* (2013.01); *C08L 2555/84* (2013.01)

(58) Field of Classification Search
CPC .................................. C08L 95/00; E01C 7/30
See application file for complete search history.

(56) References Cited

U.S. PATENT DOCUMENTS

2007/0221095 A1* 9/2007 Mehta ................ C08L 95/00
                                                    106/280
2010/0240526 A1* 9/2010 Hong .................. B82Y 30/00
                                                    502/84

* cited by examiner

*Primary Examiner* — Peter D. Mulcahy
(74) *Attorney, Agent, or Firm* — Im IP Law; C. Andrew Im; Chai Im

(57) ABSTRACT

A high-grade asphalt composition includes 100 parts by weight of asphalt; 40-80 parts by weight of styrene-isoprene-styrene; 20-60 parts by weight of a polymer resin; 10-50 parts by weight of an anti-rutting agent; 2-15 parts by weight of a filler; 5-30 parts by weight of ceramic nanoparticles; 5-10 parts by weight of a binder; 3-15 parts by weight of an antioxidant; 1-10 parts by weight of a stabilizer; 5-20 parts by weight of a fiber; and 2-20 parts by weight of an adhesion promoter. A construction method is provided using the asphalt composition. The present asphalt composition is not easily rutted, aged and/or stripped. At the same time, the present asphalt can prevent water penetration and potholes, can reduce noise, and enable the roads to be paved at low costs.

6 Claims, No Drawings

HIGH-GRADE ASPHALT COMPOSITION HAVING WATERPROOF FUNCTION AND CONSTRUCTION METHOD USING THE SAME

RELATED APPLICATION

This application claims priority from Korean Patent Application No. 10-2016-0014074 filed Feb. 4, 2016, which is incorporated herein by reference in its entirety.

FIELD OF THE INVENTION

The present invention relates to a high-grade asphalt composition and a construction method using the same, and more particularly, to a high-grade asphalt composition having a performance grade of PG 82-34 and waterproof function and to a construction method using the same.

BACKGROUND OF THE INVENTION

Asphalt is a residue that remains after evaporation of volatile fractions among crude oil components. It is a very complex chemical compound composed mainly of hydrogen and carbon and having bonded thereto small amounts of nitrogen, sulfur and oxygen. It is widely used as a binder for aggregate in the paving of roads on which cars mainly run.

Asphalt is a temperature-susceptible material that changes to a liquid state upon heating and is cured at low temperature. In order to increase the workability of asphalt in road paving, asphalt or aggregate, or both, is used after warming to a predetermined temperature. In the case in which an asphalt composition is transported in divided amounts by trucks or in which the transport distance from an asphalt production plant to a construction site is long or in which the temperature of asphalt decreases with time when being used in construction in a severely cold climate in the winter season, the asphalt concrete composition is cured so as to be difficult to pave, and compaction of the asphalt pavement or the adhesion between aggregate and the asphalt binder is poor so that the quality of the asphalt pavement is poor.

For these reasons, in view of the physical properties of asphalt to soften upon heating and to be cured at low temperature, as well as a variety of paving construction environments such as seasons or transport distances, a sufficient amount of heat should be applied to conventional asphalt to impart softness to the asphalt in order to achieve sufficient workability of the asphalt in paving.

Meanwhile, asphalt pavements sometimes undergo rutting (plastic deformation), which causes serious running problems, along running tracks before 5 years after construction. Alternatively, even though there is no rutting problem, the pavement materials are gradually aged with the passage of time, and eventually undergo severe cracking. For these reasons, asphalt pavements should be regularly repaired. As an example of methods for repairing asphalt pavements, Korean Patent No. 0880030 discloses an asphalt composition for emergency repair of road pavement, which comprises 60-80 wt % of asphalt cement; 15-35 wt % of vegetable oil; and a binder comprising aliphatic polyamides.

Until now, as a method for repair of road and bridge deck pavements, a modified asphalt overlay of grade 2-3 (PG 64-22.76-22) has been generally applied.

However, the asphalt overlay of grade 2-3 has problems in that it has a short life span and insufficient adhesive strength and flexibility, and thus material separation and potholes frequently occur.

Accordingly, in order to minimize the cost of the above-described repair, it is required to develop an asphalt composition which minimizes the rutting of roads paved with the asphalt and which is not aged for a long period of time while not being easily stripped.

SUMMARY OF THE INVENTION

The present invention has been made in order to solve the above-described problems, and is intended to provide a high-grade asphalt composition, specifically a high-grade asphalt composition having a performance grade of PG 82-34 and waterproof function, in which the asphalt composition is not easily rutted, aged and/or stripped, and, at the same time, can prevent water penetration and potholes, can reduce noise, and makes it possible to pave roads at low costs.

The present invention provides a high-grade asphalt composition, comprising: 100 parts by weight of asphalt; 40-80 parts by weight of styrene-isoprene-styrene; 20-60 parts by weight of polymer resin; 10-50 parts by weight of an anti-rutting agent; 2-15 parts by weight of a filler; 5-30 parts by weight of ceramic nanoparticles; 5-10 parts by weight of a binder; 3-15 parts by weight of an antioxidant; 1-10 parts by weight of a stabilizer; 5-20 parts by weight of a fiber; and 2-20 parts by weight of an adhesion promoter.

The present invention provides a construction method using a high-grade asphalt composition, the method comprising the step of:

(i) treating a smooth asphalt surface with a tack coat;

(ii) paving a high-grade asphalt composition, comprising 100 parts by weight of asphalt, 40-80 parts by weight of styrene-isoprene-styrene, 20-60 parts by weight of polymer resin, 10-50 parts by weight of an anti-rutting agent, 2-15 parts by weight of a filler, 5-30 parts by weight of ceramic nanoparticles, 5-10 parts by weight of a binder, 3-15 parts by weight of an antioxidant, 1-10 parts by weight of a stabilizer, 5-20 parts by weight of a fiber, and 2-20 parts by weight of an adhesion promoter, on the asphalt surface treated with the tack coat, to a thickness of 20-100 mm, thereby forming a first base course;

(iii) treating the surface of the first base course, formed in step (ii), with a tack coat;

(iv) paving the same high-grade asphalt composition as used in step (ii), on the asphalt surface resulting from step (iii) to a thickness of 10-80 mm, thereby forming a second base course; and (v) curing the high-grade asphalt composition paved in steps (ii) and (iv).

DETAILED DESCRIPTION OF THE INVENTION

Hereinafter, the present invention will be described in detail.

In one aspect, the present invention provides a high-grade asphalt composition, comprising: 100 parts by weight of asphalt; 40-80 parts by weight of styrene-isoprene-styrene; 20-60 parts by weight of polymer resin; 10-50 parts by weight of an anti-rutting agent; 2-15 parts by weight of a filler; 5-30 parts by weight of ceramic nanoparticles; 5-10 parts by weight of a binder; 3-15 parts by weight of an antioxidant; 1-10 parts by weight of a stabilizer; 5-20 parts by weight of a fiber; and 2-20 parts by weight of an adhesion promoter.

In another aspect, the present invention provides a construction method using a high-grade asphalt composition, the method comprising the step of:

(i) treating a smooth asphalt surface with a tack coat;

(ii) paving a high-grade asphalt composition, comprising 100 parts by weight of asphalt, 40-80 parts by weight of styrene-isoprene-styrene, 20-60 parts by weight of polymer resin, 10-50 parts by weight of an anti-rutting agent, 2-15 parts by weight of a filler, 5-30 parts by weight of ceramic nanoparticles, 5-10 parts by weight of a binder, 3-15 parts by weight of an antioxidant, 1-10 parts by weight of a stabilizer, 5-20 parts by weight of a fiber, and 2-20 parts by weight of an adhesion promoter, on the asphalt surface treated with the tack coat, to a thickness of 20-100 mm, thereby forming a first base course;

(iii) treating the surface of the first base course, formed in step (ii), with a tack coat;

(iv) paving the same high-grade asphalt composition as used in step (ii), on the asphalt surface resulting from step (iii) to a thickness of 10-80 mm, thereby forming a second base course; and (v) curing the high-grade asphalt composition paved in steps (ii) and (iv).

Asphalt that is used in the present invention is not particularly limited as long as it is generally used in the art. Preferably, petroleum-based asphalt or an asphalt mixture may be used in the present invention.

Herein, the asphalt mixture is preferably a natural asphalt mixture.

The asphalt mixture, specifically a natural asphalt mixture, is not particularly limited, as long as it is a natural asphalt mixture that is generally used in the art. Preferably, the asphalt mixture is a mixture of straight asphalt and at least one selected from among Trinidad lake asphalt, Trinidad epure asphalt and a mixture thereof. More preferably, the asphalt mixture is a mixture of straight asphalt having a penetration index of 20-40 with natural asphalt, for example, Trinidad lake asphalt and/or Trinidad epure asphalt. Even more preferably, the asphalt mixture is a mixture of 70-80 wt % of straight asphalt having a penetration index of 20-40 with 20-30 wt % of natural asphalt composed of Trinidad lake asphalt or Trinidad epure asphalt.

As used herein, the term "straight asphalt" refers to general petroleum asphalt obtained by refining a fraction that remains after drying or distillation of crude petroleum. Straight asphalt that is used in the present invention preferably has a penetration index of 20-40 in view of the easiness of pavement of roads.

The straight asphalt is preferably contained in the asphalt mixture in an amount of 70-80 wt %. If the content of the straight asphalt in the asphalt mixture is less than 70 wt %, a long period of time can be required for curing of the asphalt pavement, and the softening point of the asphalt mixture can be reduced. If the content of the straight asphalt in the asphalt mixture is more than 80 wt %, the fluidity of the asphalt mixture can be reduced.

In addition, the natural asphalt that is used in the present invention serves to improve the fluidity of the asphalt composition of the present invention and to increase the rutting resistance, skid resistance and frictional resistance of the asphalt composition.

The natural asphalt that is used in the present invention may be Trinidad lake asphalt and/or Trinidad epure asphalt.

The natural asphalt is preferably contained in the asphalt mixture in an amount of 20-30 wt %. If the content of the natural asphalt in the asphalt mixture is less than 20 wt %, the effect of improving the fluidity, rutting resistance, skid resistance and frictional resistance of the asphalt composition will be insignificant, and if the content of the natural asphalt is more than 30 wt %, the high-grade asphalt composition of the present invention can be softened, and the softening point thereof can be reduced.

The contents of components other than asphalt in the high-grade asphalt composition according to the present invention are based on 100 parts by weight of the asphalt.

Styrene-isoprene styrene (SIS) that is used in the present invention serves to impart physical properties (e.g., flexibility, stress and adhesive strength), which correspond to a performance grade (PG) of PG 82-34 as measured by an asphalt binder performance grade (PG) test, to the asphalt composition.

Although the amount of styrene-isoprene styrene used is not particularly limited, it is preferably at least 40 parts by weight, more preferably 40-80 parts by weight, based on 100 parts by weight of the asphalt.

The polymer resin that is used in the present invention serves to inhibit the occurrence of cracks in the high-grade asphalt composition, impart waterproof function to the asphalt composition and improve the strength of the asphalt composition. The polymer resin is not particularly limited, as long as it is a polymer resin that performs such functions. Preferably, the polymer resin that is used in the present invention comprises at least one selected from among polyester, a thermoplastic polyurethane (TPU) elastomer, methyl methacrylate (MMA), an ethylene vinyl acetate (EVA) copolymer, polyamide, and mixtures thereof.

Although the content of the polymer resin in the asphalt composition is not particularly limited, it is preferably 20-60 parts by weight based on 100 parts by weight of the asphalt contained in the high-grade asphalt composition.

Preferably, the polymer resin that is used in the present invention is methyl methacrylate (MMA).

The methyl methacrylate has excellent adhesion to asphalt and/or concrete roads, and can maintain excellent binder properties and mechanical properties to significantly inhibit cracking and stripping phenomena caused by a continuous load applied onto the asphalt composition.

In a specific embodiment of the present invention, the methyl methacrylate that is used in the present invention may be a modified methyl methacrylate obtained by adding 1-10 wt % of at least one, selected from among styrene butadiene rubber (SBR) and styrene-butadiene-styrene (SBS), to a mixture of 49-70 wt % of a low-viscosity methyl methacrylate (MMA) resin having a viscosity of 10-1,000 cps and 20-50 wt % of a high-viscosity methyl methacrylate (MMA) resin having a viscosity of 2,000-20,000 cps.

If the content of SBR and/or SBS in the modified methyl methacrylate is less than 1 wt %, cracks can occur due to a reduction in impact resistance, and if the content of SBR and/or SBS is more than 10 wt %, the viscosity of the modified methyl methacrylate can increase to cause problems in terms of the workability of the asphalt composition. In addition, in the latter case, the asphalt composition will disadvantageously be softened, and thus the skid resistance of the asphalt composition can be reduced by stamping phenomena (such as wheel traces) caused by the walker or bicycle's load.

The anti-rutting agent that is used in the present invention preferably comprises polyethylene, ethylene vinyl acetate, polybutene, high-impact polystyrene, polypropylene, or a mixture of two or more thereof, and is preferably used in an amount of 10-50 parts based on 100 parts by weight of the asphalt.

If the anti-rutting agent is used in an amount of less than 10 parts by weight, the effect of preventing rutting will be insignificant, and if the anti-rutting agent is used in an amount of 50 parts by weight, it will not be easily mixed with other components of the asphalt composition.

The filler that is used in the present invention serves to improve the dimensional stability and abrasion resistance of the asphalt composition. Any filler may be used in the present invention, as long as it performs such functions. The filler is preferably used in an amount of 2-15 parts by weight based on 100 parts by weight of the asphalt.

If the filler is used in an amount of less than 2 parts by weight, the dimensional stability, abrasion resistance and thixotropic properties of the asphalt composition will be reduced, resulting in a reduction in the durability of the composition, and if the filler is used in an amount of more than 15 parts by weight, it will increase the thixotropic properties of the asphalt composition to reduce the workability and impact resistance of the present invention.

The filler that is used in the present invention may preferably be one or more selected from among Benton, silica, calcium carbonate, talc, barium sulfate, and aluminum hydroxide.

The ceramic nanoparticles that are used in the present invention float to the surface during curing of the asphalt composition to form a dense, high-hardness surface. Thus, these ceramic nanoparticles serve to prevent the penetration of water vapor and other gases or liquids and to improve the moisture resistance, durability, weather resistance, impact resistance and chemical resistance of the asphalt composition.

The ceramic nanoparticles are preferably used in an amount of 5-30 parts by weight based on 100 parts by weight of the asphalt.

Preferably, the ceramic nanoparticles comprise silicon carbide, alumina, silica, zirconia-silica, ZnO, $TiO_2$ and/or $CaCO_3$.

These ceramic nanoparticles preferably have a mean particle size on the order of nanometers. Specifically, the silicon carbide has a mean particle size of 300-500 nm; the alumina has a mean particle size of 500-1000 nm; the silica has a mean particle size of 700-1500 nm; the zirconia-silica has a mean particle size of 500-1000 nm; the ZnO has a mean particle size of 500-1000 nm; the $TiO_2$ has a mean particle size of 100-300 nm; and the $CaCO_3$ has a mean particle size of 500-1000 nm.

Among them, the silicon carbide does not exist as a natural mineral, is artificially synthesized, shows excellent chemical stability and corrosion resistance at high temperature, and has high hardness.

The binder that is used in the present invention serves to improve the binding strength of an asphalt composition, specifically a high-grade asphalt composition, and is not particularly limited as long as it is a conventional binder that performs such functions. Preferably, the binder that is used in the present invention comprises petroleum-based resin, phenolic resin, rosin resin, or a mixture of two or more thereof.

The binder is preferably used in an amount of 5-10 parts by weight based on 100 parts by weight of the asphalt.

The antioxidant that is used in the present invention serves to prevent the oxidation of the high-grade asphalt composition.

Preferably, the antioxidant may be an amine-, bisphenol-, monophenol- or sulfur-based antioxidant, and is used in an amount of 3-20 parts by weight based on 100 parts by weight of the asphalt.

The stabilizer that is used in the present invention serves to impart stability to the asphalt composition by protecting the asphalt composition from UV light. Any conventional stabilizer having this function may be used in the present invention. Preferably, the stabilizer may comprise acrylic polyol resin, non-yellowing polyurea resin, polyisocyanate, or a mixture of two or more thereof, and is used in an amount of 1-10 parts by weight based on 100 parts by weight of the asphalt.

The fiber that is used in the present invention serves to impart tension (caused by longitudinal or transverse stress) and/or lightweight properties to a pavement surface formed of the high-grade asphalt composition. Any fiber having this function may be used in the present invention. Preferably, the fiber that is used in the present invention comprises any one or a mixture of two or more selected from among asbestos, rock wool, polypropylene, polyester, glass fiber, natural cellulose fibers and mineral fibers, and is used in an amount of 5-20 parts by weight based on 100 parts by weight of the asphalt.

The adhesion promoter that is used in the present invention enables the asphalt composition to easily adhere to a surface on which the asphalt composition is to be paved. Preferably, the adhesion promoter may comprise hydroxyethyl acryloyl phosphate, hydroxyethyl methacrylate phosphate, or a mixture thereof, and is used in an amount of 2-20 parts by weight based on 100 parts by weight of the asphalt.

In a specific embodiment, an asphalt composition according to the present invention, specifically a high-grade asphalt composition having waterproof function, may further comprise a crosslinked polyacrylate salt which is swollen by water absorption to fill asphalt pores to thereby prevent water penetration into the asphalt composition and improve the durability of the asphalt composition. The crosslinked polyacrylate salt may be contained in an amount of 20-50 parts by weight based on 100 parts by weight of the asphalt.

As used herein, the term "crosslinked polyacrylate salt" refers to a material obtained by crosslinking an acrylate salt polymer. It is a kind of highly absorbable polymer, consists of a copolymer of sodium acrylate with acrylic acid as a crosslinking agent, and has a molecular formula of $(C_3H4O_2.C_3H_3O_2Na)x$.

The crosslinked polyacrylate salt as described above is a polymer that absorbs fluids due to either a three-dimensional network structure obtained by crosslinking between polymer chains or a hydrophilic group introduced into a single chain structure. It has an absorption ability that is significantly higher than those of general polymer materials, and it is used as a highly functional material to realize the slimness and high performance of sanitary articles. When the crosslinked polyacrylate salt that is a highly absorbable polymer is used in the asphalt composition, it will be swollen by water absorption to fill the internal pores of the asphalt composition to thereby prevent water penetration into the asphalt composition and improve the durability of the asphalt composition.

In another specific embodiment, the asphalt composition according to the present invention may further comprise a curing agent for curing the composition. The curing agent may be contained in an amount of 2-30 parts by weight based on 100 parts by weight of the asphalt.

The curing agent serves to cure the asphalt composition, and any curing agent having this function may be used in the present invention. Preferably, the curing agent that is used in the present invention may be 4,4-diphenylmethane diisocyanate (MDI), hexamethylenetetramine, amine, polyamide, or a mixture of two or more thereof, and may be used in an amount of 2-30 parts by weight based on 100 parts by weight of the asphalt.

In a specific embodiment, the curing agent may further comprise a low-profile agent.

In this case, the low-profile agent is used in an amount of 30 wt % or less based on the total weight of the curing agent.

Preferably, the low-profile agent that is used in the present invention is an unsaturated polyester-based low-profile agent, for example, a low-profile agent composed of unsaturated polyester resin.

In another embodiment, the asphalt composition according to the present invention may further comprise an anti-stripping agent in an amount of 5-30 parts by weight based on 100 parts by weight of the asphalt composition, in order to prevent the asphalt composition from being easily stripped from the pavement surface.

Preferably, the anti-stripping agent that is used in the present invention is a polyphosphoric acid-, amine- or phosphoric ester-based anti-stripping agent.

In a specific embodiment, the anti-stripping agent may be a liquid polyphosphoric acid-based anti-stripping agent having a specific gravity of 1.0 or higher and a viscosity of 110 cPs at 60° C., or an amine-based anti-stripping agent having an acid value of 10 mgKOH/g or less and a total amine value of 140-400 mgHCl/g.

In another specific embodiment, the asphalt composition according to the present invention may further comprise a wax in an amount of 2-5 parts by weight based on 100 parts by weight of the asphalt, in order to prevent the dried surface from becoming tacky to thereby prevent the surface from being contaminated due to vehicle traffic.

Preferably, the wax that is used in the present invention is polyethylene wax, polypropylene wax, or a mixture thereof.

In another specific embodiment, the high-grade asphalt composition according to the present invention may further comprise waste asphalt.

The waste asphalt that is used in the present invention is generally asphalt generated when replacing aged or damaged asphalt used for pavement. The waste asphalt is used in an amount of 50-150 parts by weight based on 100 parts by weight of the asphalt.

If the waste asphalt is added to the asphalt composition to make a new asphalt composition, an asphalt performance improving agent may be added to the asphalt composition in order to improve the function of the waste asphalt having reduced function.

The asphalt performance improving agent that is used in the present invention may be any asphalt performance improving agent which is generally used in the art. The asphalt performance improving agent is preferably used in an amount of 5-30 parts by weight based on 100 parts by weight of the asphalt.

The performance improving agent that is used in the present invention preferably comprises, based on the total weight of the performance improving agent, 90-99.5 wt % of vinyl acetate monomer-paraffin oil and 0.5-10 wt % of benzoyl peroxide.

Herein, the vinyl acetate monomer-paraffin oil is preferably a mixture of 5-25 wt % of a vinyl acetate monomer and 75-95 wt % of paraffin oil.

In another specific embodiment, the asphalt composition according to the present invention may further comprise a polymer modifier.

The polymer modifier that is used in the present invention may be any polymer modifier that is generally used in the art, and it is preferably used in an amount of 2-40 parts by weight based on 100 parts by weight of the asphalt.

In one embodiment, the polymer modifier that is used in the present invention preferably comprises a polymer resin selected from the group consisting of natural rubber, nitrile rubber, styrene-butadiene rubber, butadiene rubber, and mixtures thereof.

In another specific embodiment, the high-grade asphalt composition according to the present invention may further comprise a bio-resin in an amount of 5-20 parts by weight based on 100 parts by weight of the asphalt, in order to inhibit the occurrence of cracks in the composition and improve the adhesion and durability of the composition.

Preferably, the bio-resin that is used in the present invention comprises oil-modified alkyd resin, oil-modified urethane resin, a fatty acid ester of oil-modified urethane resin, oil-modified epoxy resin, a fatty acid ester of oil-modified epoxy resin, bio-derived polyethylene resin, L-polylactic acid, or a mixture of two or more thereof. More preferably, oil-modified alkyd resin is used.

As used herein, the term "oil-modified" refers to a refer containing an oil component such as fatty acid in the molecule. The use of this oil-modified resin makes it easy to control dispersibility, mechanical properties, curability, and film forming ability.

Specifically, the bio-resin may be used in a mixture with a vegetable oil extracted from a plant or a plant seed, for example, rice oil, palm oil, coconut oil, castor oil, grape seed oil, jojoba oil, safflower oil, Macadamia nut oil, olive seed oil, and a mixture of two or more thereof.

Herein, the mixing ratio between the bio-resin and the vegetable oil may vary depending on the user's choice, but is preferably a weight ratio of 1:9 to 9:1 (bio-resin: vegetable oil).

In still another specific embodiment, the asphalt composition according to the present invention may further comprise a plasticizer in order to reduce the viscosity of the composition at a temperature of 80° C. or higher and to facilitate the mixing between the components of the high-grade asphalt composition.

Preferably, the plasticizer is selected from the group consisting of a metal salt of terephthalic acid, a metal salt of stearic acid, petroleum resin, low-molecular-weight polyethylene, and low-molecular-weight polyamide, and is used in an amount of 1-20 parts by weight based on 100 parts by weight of the asphalt.

If the plasticizer is used in an amount of less than 1 part by weight, it will have no effect, and if the plasticizer is used in an amount of more than 20 parts by weight, it will reduce the viscosity of the asphalt composition to reduce the rutting resistance of the composition.

In still another specific embodiment, the high-grade asphalt composition according to the present invention may further comprises a filling material in an amount of 2-30 parts by weight based on 100 parts by weight of the asphalt.

The filling material serves to improve the pore filling property, stability, abrasion resistance and rut resistance of the high-grade asphalt composition having waterproof function according to the present invention, thereby improving the Marshall stability of the composition.

Preferably, the filling material that is used in the present invention comprises one or more selected from the group consisting of lime powder, Portland cement, slaked lime, fly ash, withdrawn dust, electric arc furnace dust, casting dust, and incineration ash.

In still another specific embodiment, the asphalt composition according to the present invention may further an anti-skid chip.

Herein, the anti-skid chip serves to prevent the skidding of vehicles, walkers and/or bicycles and provide elasticity to thereby improve walking and driving feelings and ensure safety. Any conventional anti-skid chip having such functions may be used in the present invention. The anti-skid chip is used in the present invention in an amount of 10-30 parts by weight based on 100 parts by weight of the asphalt, but is not limited thereto.

Preferably, the anti-skid chip that is used in the present invention comprises an ethylene propylene diene monomer (EPDM), polyurethane (PU), waste tires, or a mixture of two or more thereof.

In still another specific embodiment, the asphalt composition according to the present invention may further comprise sodium benzoate in an amount of 0.1-1 part by weight based on 100 parts by weight of the asphalt in order to increase the viscoelasticity of the asphalt. If sodium benzoate is used in an amount of less than 0.1 parts by weight, the effect thereof will be insignificant, and if sodium benzoate is used in an amount of more than 1 part by weight, it will reduce the physical properties of the composition.

In still another specific embodiment, the asphalt composition according to the present invention may further comprise methylene diphenyl diisocyanate in an amount of 0.1-2 parts by weight based on 100 parts by weight of the asphalt.

The methylene diphenyl diisocyanate that is used in the present invention severs to prevent a reduction in the physical properties of the fiber even after a long period of time and prevent a rapid reduction in the performance of the composition and also maintain the adhesion and strength of the asphalt composition.

In still another specific embodiment, the asphalt composition according to the present invention may further comprise a dimer acid in an amount of 0.1-2 parts by weight based on 100 parts by weight of the asphalt, in order to prevent the stripping of a layer formed of the paved asphalt composition.

The dimer acid is preferably a dimer of vegetable oil fatty acid, even though the origin and form thereof are not greatly limited. Herein, the vegetable oil fatty acid may comprise one or more selected from the group consisting of oleic acid, linoleic acid, stearic acid and palmitic acid.

In still another specific embodiment, the asphalt composition according to the present invention may further comprise tetraethylenepentamine (TEPA) in an amount of 1-10 parts by weight based on 100 parts by weight of the asphalt, in order to control the viscosity of the composition and increase the strength of the composition. If the tetraethylenepentamine (TEPA) is used in an amount of less than 1 part by weight based on 100 parts by weight of the asphalt, the effect thereof will be insignificant, and if the tetraethylenepentamine is used in an amount of more than 10 parts by weight, it will adversely affect the physical properties of the asphalt composition.

Hereinafter, a construction method using the high-grade asphalt composition, specifically the high-grade asphalt composition having waterproof function, as described above, will be described.

The construction method using the high-grade asphalt composition is not particularly limited, but comprises the steps of:

(i) treating a smooth asphalt surface with a tack coat;
(ii) paving a high-grade asphalt composition, comprising 100 parts by weight of asphalt, 40-80 parts by weight of styrene-isoprene-styrene, 20-60 parts by weight of a polymer resin, 10-50 parts by weight of an anti-rutting agent, 2-15 parts by weight of a filler, 5-30 parts by weight of ceramic nanoparticles, 5-10 parts by weight of a binder, 3-15 parts by weight of an antioxidant, 1-10 parts by weight of a stabilizer, 5-20 parts by weight of a fiber, and 2-20 parts by weight of an adhesion promoter, on the asphalt surface treated with the tack coat, to a thickness of 20-100 mm, thereby forming a first base course;
(iii) treating the surface of the first base course, formed in step (ii), with a tack coat;
(iv) paving the same high-grade asphalt composition as used in step (ii), on the asphalt surface resulting from step (iii) to a thickness of 10-80 mm, thereby forming a second base course; and
(v) curing the high-grade asphalt composition paved in steps (ii) and (iv).

Herein, the tack coat comprises asphalt, purified water and an emulsifier. Preferably, the tack coat comprises 100 parts by weight of asphalt, 30-50 parts by weight of purified water and 1-5 parts by weight of an emulsifier.

Hereinafter, the present invention will be described in detail with reference to examples. It is to be understood, however, that these examples are for illustrative purposes only and are not intended to limit the scope of the present invention.

Example 1

A high-grade asphalt composition was prepared by mixing 100 g of petroleum-based asphalt AP-3, 60 g of styrene-isoprene-styrene, 40 g of methyl methacrylate, 25 g of an anti-rutting agent composed of ethylene vinyl acetate, 8 g of silica as a filler, 15 g of silicon carbide having a mean particle size of 400 nm, 7 g of rosin resin, 10 g of a monophenolic antioxidant, 5 g of non-yellowing polyurea resin, 10 g of natural cellulose fiber, and 10 g of hydroxyethyl acryloyl phosphate.

Example 2

A high-grade asphalt composition was prepared in the same manner as described in Example 1, except that 35 g of a crosslinked polyacrylate salt was further added.

Example 3

A high-grade asphalt composition was prepared in the same manner as described in Example 1, except that 15 g of 4,4-diphenylmethane diisocyanate was further added.

Example 4

A high-grade asphalt composition was prepared in the same manner as described in Example 3, except that a curing agent comprising 12 g of 4,4-diphenylmethane diisocyanate and 3 g of a low-profile agent composed of unsaturated polyester resin was used instead of 15 g of 4,4-diphenylmethane diisocyanate.

Example 5

A high-grade asphalt composition was prepared in the same manner as described in Example 1, except that a polyphosphoric acid-based anti-stripping agent having a specific gravity of 1.0 or higher and a viscosity of 110 cPs at 60° C. was further used.

Example 6

A high-grade asphalt composition was prepared in the same manner as described in Example 1, except that 3 g of polyethylene wax was further used.

Example 7

A high-grade asphalt composition was prepared in the same manner as described in Example 1, except that 70 g of waste asphalt was further used.

Example 8

A high-grade asphalt composition was prepared in the same manner as described in Example 7, except that an asphalt performance improving agent comprising 13.5 g of vinyl acetate monomer-paraffin oil and 1.5 g of benzoyl peroxide was further used.

Example 9

A high-grade asphalt composition was prepared in the same manner as described in Example 1, except that 20 g of a polymer modifier comprising nitrile rubber was further used.

Example 10

A high-grade asphalt composition was prepared in the same manner as described in Example 1, except that 10 g of oil-modified alkyd resin was further used.

Example 11

A high-grade asphalt composition was prepared in the same manner as described in Example 1, except that 8 g of oil-modified alkyd resin and 2 g of coconut oil were further used.

Example 12

A high-grade asphalt composition was prepared in the same manner as described in Example 1, except that 10 g of a metal salt of terephthalic acid was further used.

Example 13

A high-grade asphalt composition was prepared in the same manner as described in Example 1, except that 15 g of Portland cement was further used.

Example 14

A high-grade asphalt composition was prepared in the same manner as described in Example 1, except that 20 g of an ethylene propylene diene monomer was further used.

Example 15

A high-grade asphalt composition was prepared in the same manner as described in Example 1, except that 0.2 g of sodium benzoate was further used.

Example 16

A high-grade asphalt composition was prepared in the same manner as described in Example 1, except that 1 g of methylene diphenyl diisocyanate was further used.

Example 17

A high-grade asphalt composition was prepared in the same manner as described in Example 1, except that 1 g of a dimer acid (UNIDYME 18, ARIZONA CHEMICAL COMPANY, USA) was further used.

Example 18

A high-grade asphalt composition was prepared in the same manner as described in Example 1, except that 5 g of tetraethylenepentamine was further used.

Comparative Example 1

A high-grade asphalt composition was prepared in the same manner as described in Example 1, except that 60 g of styrene-isoprene-styrene was excluded.

Comparative Example 1

A high-grade asphalt composition was prepared in the same manner as described in Example 1, except that 7 g of rosin resin was excluded.

Test Example 1

The stability, porosity, tensile strength ratio TSR and dynamic stability of the asphalt compositions prepared in the Examples and the Comparative Examples were measured according to the test methods described in SPS-KAI0002-F2349-568, and the results of the measurement are shown in Table 1 below.

TABLE 1

| | Physical properties 1 | | | |
|---|---|---|---|---|
| | Stability (N) | Porosity (%) | Tensile strength ratio (TSR) | Dynamic stability (times/mm) |
| Example 1 | 8488 | 0.3 | 0.90 | 3.052 |
| Example 2 | 8436 | 0.4 | 0.92 | 3.086 |
| Example 3 | 8512 | 0.3 | 0.91 | 3.128 |
| Example 4 | 8454 | 0.4 | 0.98 | 3.075 |
| Example 5 | 8467 | 0.4 | 0.90 | 3.164 |
| Example 6 | 8529 | 0.3 | 0.92 | 3.230 |
| Example 7 | 8568 | 0.3 | 0.91 | 3.239 |
| Example 8 | 8488 | 0.2 | 0.91 | 3.165 |
| Example 9 | 8588 | 0.2 | 0.96 | 3.198 |
| Example 10 | 8845 | 0.3 | 0.90 | 3.244 |
| Example 11 | 8586 | 0.3 | 0.91 | 3.365 |
| Example 12 | 8478 | 0.2 | 0.97 | 3.213 |
| Example 13 | 8790 | 0.3 | 0.95 | 3.244 |
| Example 14 | 8587 | 0.3 | 0.96 | 3.231 |
| Example 15 | 8588 | 0.2 | 0.94 | 3.364 |
| Example 16 | 8578 | 0.2 | 0.98 | 3.214 |
| Example 17 | 8791 | 0.3 | 0.94 | 3.224 |
| Example 18 | 8586 | 0.3 | 0.95 | 3.211 |
| Comparative Example 1 | 5902 | 0.8 | 0.76 | 2.301 |
| Comparative Example 2 | 5818 | 0.7 | 0.75 | 2.320 |

Test Example 2

The Marshall stability, flow index, saturation degree and skid resistance of the asphalt compositions prepared in the Examples and the Comparative Examples were measured according to the test methods described in KS F 2349, and the results of the measurement are shown in Table 2 below.

TABLE 2

Physical properties 2

| | Marshall stability (N) | Flow index (1/100 cm) | Saturation degree (%) | Skid resistance (BPN) |
|---|---|---|---|---|
| Example 1 | 9384 | 32 | 98 | 60 |
| Example 2 | 9372 | 33 | 98 | 61 |
| Example 3 | 9451 | 31 | 98 | 62 |
| Example 4 | 9534 | 32 | 97 | 61 |
| Example 5 | 9586 | 32 | 97 | 64 |
| Example 6 | 9392 | 33 | 98 | 60 |
| Example 7 | 9392 | 31 | 98 | 62 |
| Example 8 | 9396 | 32 | 98 | 63 |
| Example 9 | 9493 | 32 | 95 | 65 |
| Example 10 | 9603 | 34 | 98 | 63 |
| Example 11 | 9598 | 31 | 99 | 65 |
| Example 12 | 9642 | 32 | 98 | 62 |
| Example 13 | 9736 | 32 | 97 | 63 |
| Example 14 | 9392 | 31 | 98 | 68 |
| Example 15 | 9498 | 31 | 98 | 65 |
| Example 16 | 9654 | 32 | 98 | 64 |
| Example 17 | 9736 | 34 | 97 | 63 |
| Example 18 | 9494 | 33 | 98 | 62 |
| Comparative Example 1 | 7853 | 23 | 86 | 46 |
| Comparative Example 2 | 7696 | 21 | 87 | 42 |

As can be seen in Tables 1 and 2 above, the asphalt compositions of the Examples showed high stability and high tensile strength, compared to those of the Comparative Examples, and also showed excellent waterproof function due to their low porosity, compared to those of Comparative Examples.

As described above, the high-grade asphalt composition, specifically the high-grade asphalt composition having waterproof function, according to the present invention, is not easily rutted, aged and/or stripped, due to its good adhesion and flexibility, and, at the same time, can prevent water penetration and potholes, can reduce noise, and makes it possible to pave roads at low costs.

While the present invention has been described with reference to the particular illustrative embodiments, it will be understood by those skilled in the art to which the present invention pertains that the present invention may be embodied in other specific forms without departing from the technical spirit or essential characteristics of the present invention. Therefore, the embodiments described above are considered to be illustrative in all respects and not restrictive. Furthermore, the scope of the present invention should be defined by the appended claims rather than the detailed description, and it should be understood that all modifications or variations derived from the meanings and scope of the present invention and equivalents thereof are included in the scope of the appended claims.

What is claimed is:

1. A high-grade asphalt composition to repair road and bridge deck pavements, comprising:
   100 parts by weight of an asphalt mixture comprising 70-80 wt. % of a petroleum-based asphalt and 20-30 wt. % of a natural asphalt, the natural asphalt comprising at least one of Trinidad lake asphalt and Trinidad epure asphalt;
   40-80 parts by weight of styrene-isoprene-styrene;
   20-60 parts by weight of a polymer resin, the polymer resin comprising at least one selected from among a polyester, a thermoplastic polyurethane elastomer, a methyl methacrylate, a polyamide, and mixtures thereof;
   10-50 parts by weight of an anti-rutting agent, the anti-rutting agent comprising a polyethylene, an ethylene vinyl acetate, a polybutene, a high-impact polystyrene, a polypropylene, or a mixture of two or more thereof;
   2-15 parts by weight of a filler, the filler comprising at least one of the following: bentonite, barium sulfate and aluminum hydroxide;
   5-30 parts by weight of ceramic nanoparticles, the ceramic nanoparticles comprising silicon carbide, alumina, silica, zirconia-silica, ZnO, and $TiO_2$;
   5-10 parts by weight of a binder, the binder comprising petroleum-based resin, phenolic resin or a mixture thereof;
   3-15 parts by weight of an antioxidant, the antioxidant being a bisphenol-, monophenol- or sulfur-based antioxidant;
   1-10 parts by weight of a stabilizer, the stabilizer comprising acrylic polyol resin, non-yellowing polyurea resin, polyisocyanate, or a mixture of two or more thereof;
   5-20 parts by weight of a fiber, the fiber comprising any one or a mixture of two or more selected from among asbestos, rock wool, polypropylene, polyester, natural cellulose fibers and mineral fibers; and
   2-20 parts by weight of an adhesion promoter, the adhesion promoter comprising hydroxyethyl acryloyl phosphate, hydroxyethyl methacrylate phosphate, or a mixture thereof.

2. The high-grade asphalt composition of claim 1, further comprising an anti-stripping agent which is a polyphosphoric acid-, amine- or phosphoric ester-based anti-stripping agent.

3. A construction method using a high-grade asphalt composition of claim 1, the method comprising the steps of:
   (i) treating a smooth asphalt surface with a tack coat;
   (ii) paving the high-grade asphalt composition on the asphalt surface treated with the tack coat to a thickness of 20-100 mm, thereby forming a first base course;
   (iii) treating the surface of the first base course, formed in step (ii), with the tack coat;
   (iv) paving the same high-grade asphalt composition used in step (ii), on the asphalt surface resulting from step (iii) to a thickness of 10-80 mm, thereby forming a second base course; and
   (v) curing the high-grade asphalt composition paved in steps (ii) and (iv).

4. The high-grade asphalt composition of claim 1, wherein the polymer resin comprises the methyl methacrylate.

5. The high-grade asphalt composition of claim 4, wherein the methyl methacrylate comprises a mixture of 49-70 weight % of a low-viscosity methyl methacrylate resin having a viscosity of 10-1,000 centipoise, 20-50 weight % of a high-viscosity methyl methacrylate resin having a viscosity of 2,000-20,000 centipoise, and 1-10 weight % of at least one selected from among styrene butadiene rubber and styrene-butadiene-styrene.

6. The high-grade asphalt composition of claim 1, wherein the silicon carbide has a mean particle size of 300-500 nm; wherein the alumina has a mean particle size of 500-1000 nm; wherein the silica has a mean particle size of 700-1500 nm; wherein the zirconia-silica has a mean particle size of 500-1000 nm; wherein the ZnO has a mean particle size of 500-1000 nm; and wherein the $TiO_2$ has a mean particle size of 100-300 nm.

* * * * *